Inventor.
James Gray, Jr.
By Hume, Groen, Clement & Hume
Attys.

Inventor.
James Gray, Jr.
By. Hume, Groen, Clement & Hume,
Attys.

Sept. 23, 1969 J. GRAY, JR 3,468,477

VOTING MACHINE

Filed March 17, 1967 4 Sheets-Sheet 3

Inventor.
James Gray, Jr.
By. Hume, Groen, Clement, + Hume.
Attys.

Inventor
James Gray, Jr
By Hume, Groen, Clement, & Hume
Att'ys.

United States Patent Office 3,468,477
Patented Sept. 23, 1969

3,468,477

VOTING MACHINE

James Gray, Jr., Wheaton, Ill., assignor to Gray Controls Corporation, Wheaton, Ill., a corporation of Illinois Filed Mar. 17, 1967, Ser. No. 624,074
Int. Cl. G07c *13/00*
U.S. Cl. 235—50 9 Claims

ABSTRACT OF THE DISCLOSURE

A portable voting machine in which the voter makes a switch selection of candidates, which selection is data punched into an individual punched card ballot in a conventional punched pattern with registry tabulatable with standard computer equipment. The punch plurally, electrically punches the card while it is moving using registration indicia associated with the card.

The present invention relates to apparatus and methods for data punching a data storage card, and to a novel voting machine employing said apparatus and methods which allows a voter to express his vote on an individual IBM-type card which he casts as his ballot, which ballot may be tabulated by a standard commercial computer.

It is an object of the invention to provide novel apparatus for punching a data storage card with sufficient accuracy for the punched data storage card to be read by conventional punched data storage card analysis equipment, which novel apparatus is sufficiently rugged, lightweight, simple and economical to be incorporable in a portable fully automatic voting machine.

It is a further object of the invention to provide a method for punching a data storage card which does not require accurate two dimensional mechanical positioning of the card and which allows the card to be punched while it is moving, yet which enables the card to be punched with sufficient registration accuracy to enable the card to be read by the conventional computer equipment for conventional punched data storage cards.

It is another object of the invention to provide a novel, compact and automatic electronic voting machine providing a bank of voter operable candidate switches and employing a data storage card as an individual ballot, which data storage card is automatically punched by the voting machine.

It is an additional object of the invention to provide an electronic voting machine in which the ballots are automatically data punched by the machine so as to be computer readable, yet so as to enable the voter to readily visually observe the vote which he has made on his ballot.

It is another object of the invention to provide a voting machine in which those ballots which have write-in votes may be fully automatically sorted out by a standard commercial computer, thereby eliminating any need for visual inspection of any other ballots.

Further objects and features of the invention pertain to the particular arrangements and structures whereby the above identified and other objects of the invention are attained.

The invention, both as to its method and means employed, will be better understood by reference to the following specification and the drawings forming a part thereof, wherein.

Figure 1:
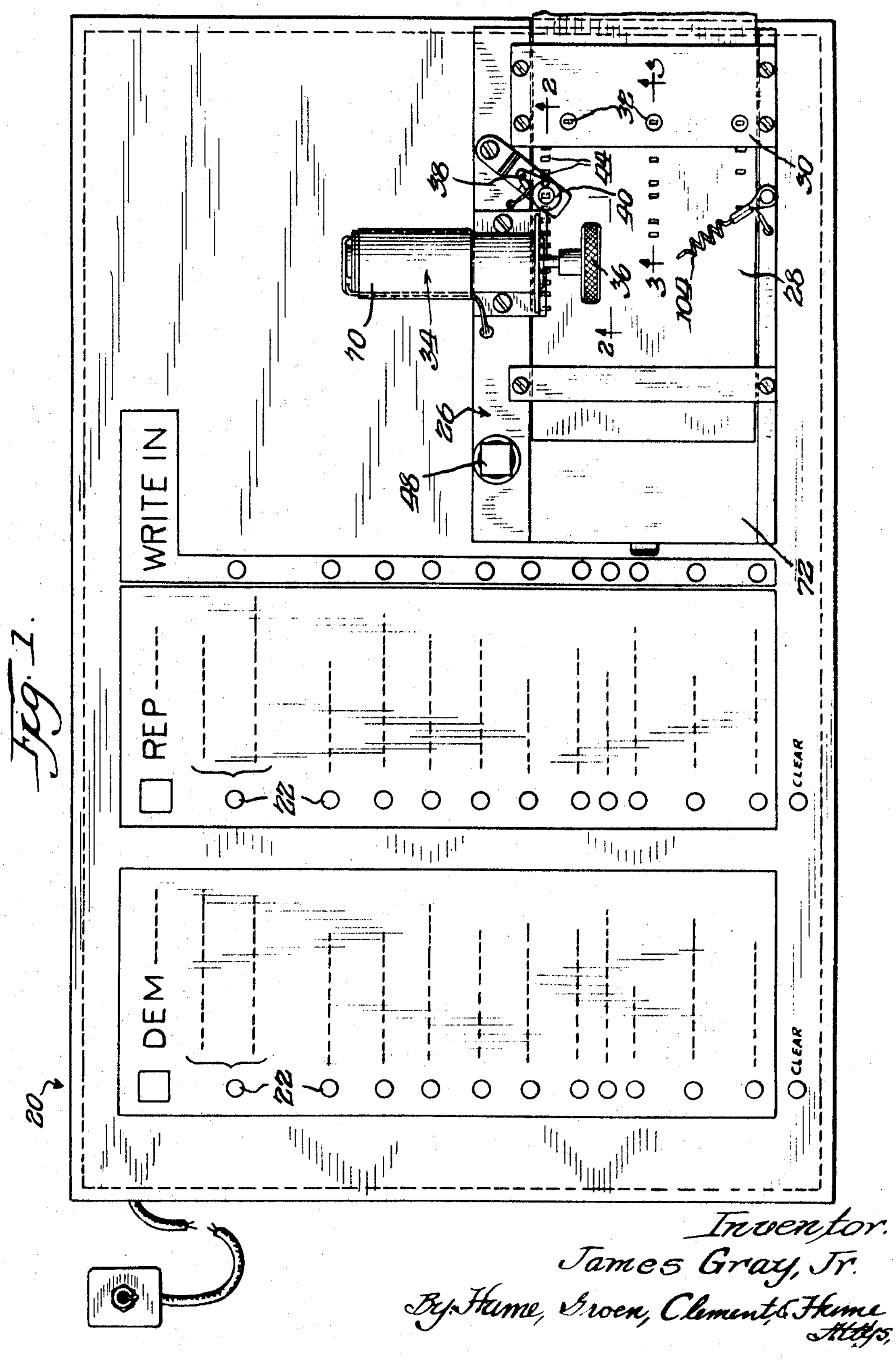
FIGURE 1 is a plan view of an exemplary voting machine incorporating an exemplary card punching apparatus for precision punching an IBM card in accordance with the present invention.
Figure 5:
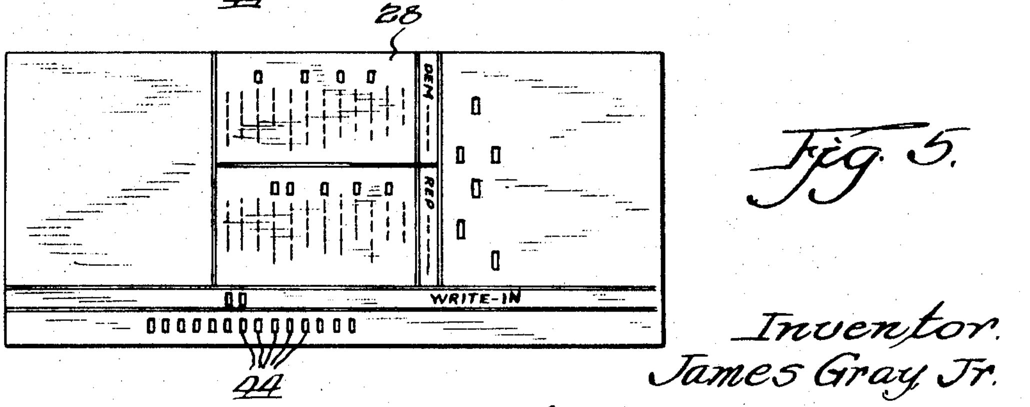
FIGURE 5 illustrates the ballot of FIGURE 4 after it has been exemplarily voted upon in the voting machine of FIGURE 1.

Turning now to the drawings and referring specifically to FIGURE 1, there is shown therein an exemplary voting machine 20 embodying the means and method of the present invention, and including the apparatus and method of the invention for punching a data storage card. The voting machine 20 includes a bank of voter operable candidate switches 22 controlling an electronic circuit 24, shown in FIGURE 6, which includes interlock circuitry to prevent excessive voting for a given office. The information signals from the electronic circuit 24 control a precision card punching unit 26 which automatically punches an IBM card as an individual ballot 28 which may be read by conventional computer equipment. The ballot 28 does not require either visual tabulation or the use of special card reading equipment. The individual ballot 28 is preferably preprinted with the names of the candidates, and the voting machine 20 is adapted to punch the ballot 28 so that the punches made therein are visably associated with the printed names of the particular candidates as shown in FIGURE 5. The voter may therefore see and check his own vote.

Briefly describing the card punching unit 26, it is a lightweight and compact portable unit which includes a card punching means 30 adapted to rapidly drive a plurality of individual standard size punches 32 through an IBM card and a card transport means 34 for moving the ballot 28 through the punching means 30 by a rotating friction wheel 36. The card punching means 30 is controlled by a sensing means 38 comprising a light 40 opposite a light sensor 42.

Briefly describing the method of the invention as practiced in the card punching unit 26, after the voter has made his selections on the candidate switches the ballot 28 is fed through the card punching unit 26. The card is moved continuously in one direction by the card transport means 34 while being guided stably in the transverse direction. Positioning indicia 44 are spaced along the edge of the ballot 28, here comprising a row of IBM holes in standard spacing. Each of the positioning indicia are sensed by the sensing means 38 having the light sensor 42 providing an output each time an individual positioning indicia 44 passes it. The signal from the light sensor is connected into the electronic circuit 24 and controls the card punching means 30. The card punching means 30 operates only in response to the sensing of positioning indicia. Thus, the spacing of the card punches along the card in the direction in which the card is transported is accomplished solely by the positioning indicia 44 and the sensing means 38. The accurate two dimensional mechanical positioning conventionally required for punching an IBM card is thereby eliminated. Punching is repeated sequentially on the card while the card is moving through the punching means 30, and the speed or evenness of the card movement is not critical.

It will be appreciated that the punching means and methods described herein are not limited in scope or application to use in a voting machine, but are applicable to data card punching in general.

Figure 6:
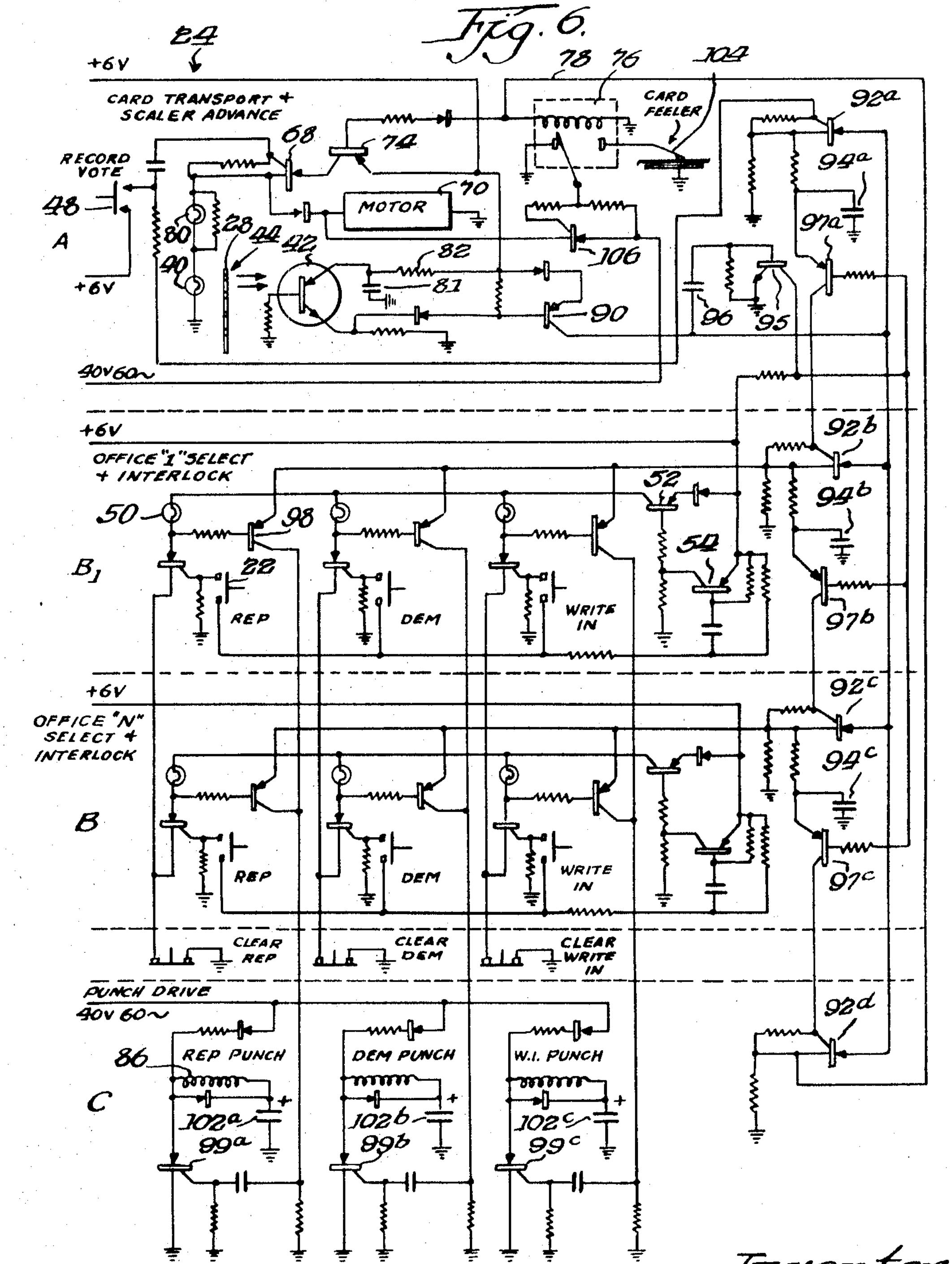
FIGURE 6 is an electrical schematic for the voting machine of FIGURE 1.

Describing a voting machine 20 in more detail, the machine is preferably used in an attache size case, which when opened exhibits the bank of candidate switches 22 shown in FIGURES 1 and 6. While there is illustrated here voting columns only for Democratic, Republican and write-in candidates, it will be appreciated that the structure and circuitry of the invention is modular and is readily adaptable for additional parties and candidates as well as for various types of special elections. Beside the name of each candidate is a candidate switch 22 which when depressed causes a light bulb 50 associated therewith to light and indicate the candidate selection. The several switches for one office are preferably electronically interlocked in the electronic circuit 24, as will be described hereinbelow, similarly to the interlocks conventionally provided mechanically so that the last (clear) switch closed automatically turns off the prior selection and thereby automatically prevents a spoiled ballot by overvoting.

Figures 7, 8:
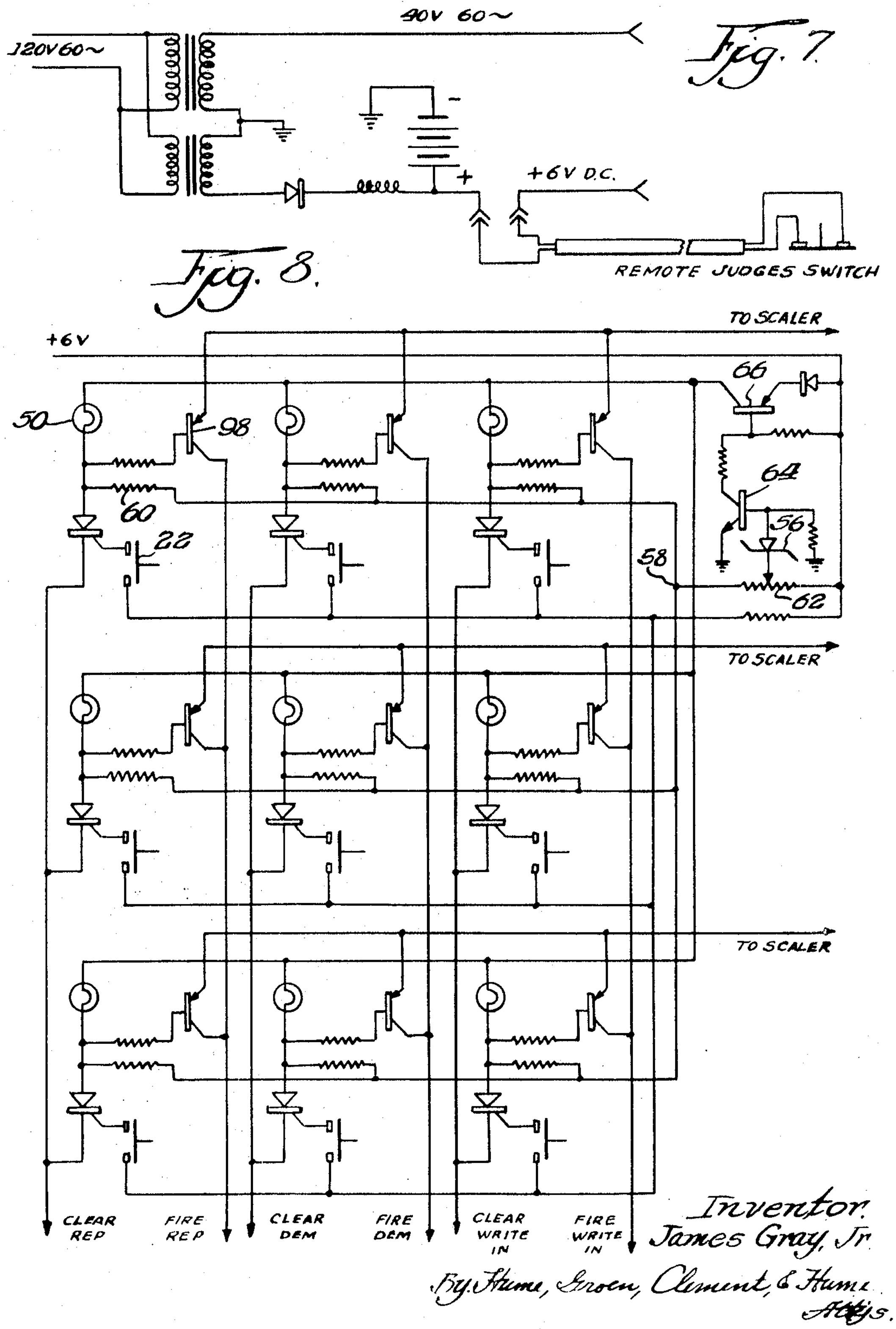
FIGURE 7 is an electrical schematic of a power supply and a remote judge's switch for the voting machine of FIGURE 1.
FIGURE 8 is an electrical schematic of a circuit used in the voting machine of FIGURE 1 in connection with candidate switches in which more than one candidate is to be selected for a given office.

The alternate interlocking circuit disclosed in FIGURE 8 may be used for an office in which the voter is allowed to vote for more than one candidate for the office, e.g. where the voter is instructed to vote for any three out of nine possible candidates. This alternate interlocking circuitry causes all previously selected candidate switches to turn off when more than the allowable number of candidates is voted. Although the interlocking concept is not novel in general, the particular circuitry provided therefor herein is simple and effective.

The power requirements of the entire voting machine 20 are minimal. Both the six volt supply and the forty volt supply shown herein may be supplied from regular 120 v. A.C. lines, or, if desired, the entire unit may be rendered free of external power requirements by the use of battery power supplies and a transistor voltage connector, or a switch choice of internal or external power may be provided. The unit is not sensitive to minor line voltage variations. The absence of any requirements for external power or a communications circuit connection is an important advantage as many polling places do not have such facilities.

Preferably at the top of each party column is a button providing a straight party vote, which will light all of the candidate buttons in the column. Similarly, at the bottom of each column there is preferably a "clear" button which will erase all votes (lights) in that column. Conventional light-duty electric switches may be used throughout for all of the candidate switches 22.

The basic operation of the voting machine by the voter may be considered in two phases. In phase one, switch selections are made or erased by the voter at will, and there is no involvement of the card punching unit 26. The lights associated with the candidate switches remain on to indicate the selections made. After the selections have been made, phase two is initiated by the voter pressing the large "record vote" button 48. This initiates phase two in which these candidate selections are punched into an IBM card ballot which the voter has been given and has previously inserted into the card punching unit 26. All candidate selections are punched into the card with standard size IBM punchouts with a registration accuracy sufficient to be computer readable. Phase two is fully automatic and does not require any voter participation other than picking up the ballot card after it is punched, inspecting it and depositing it in a ballot box.

Figures 2, 3, 4:
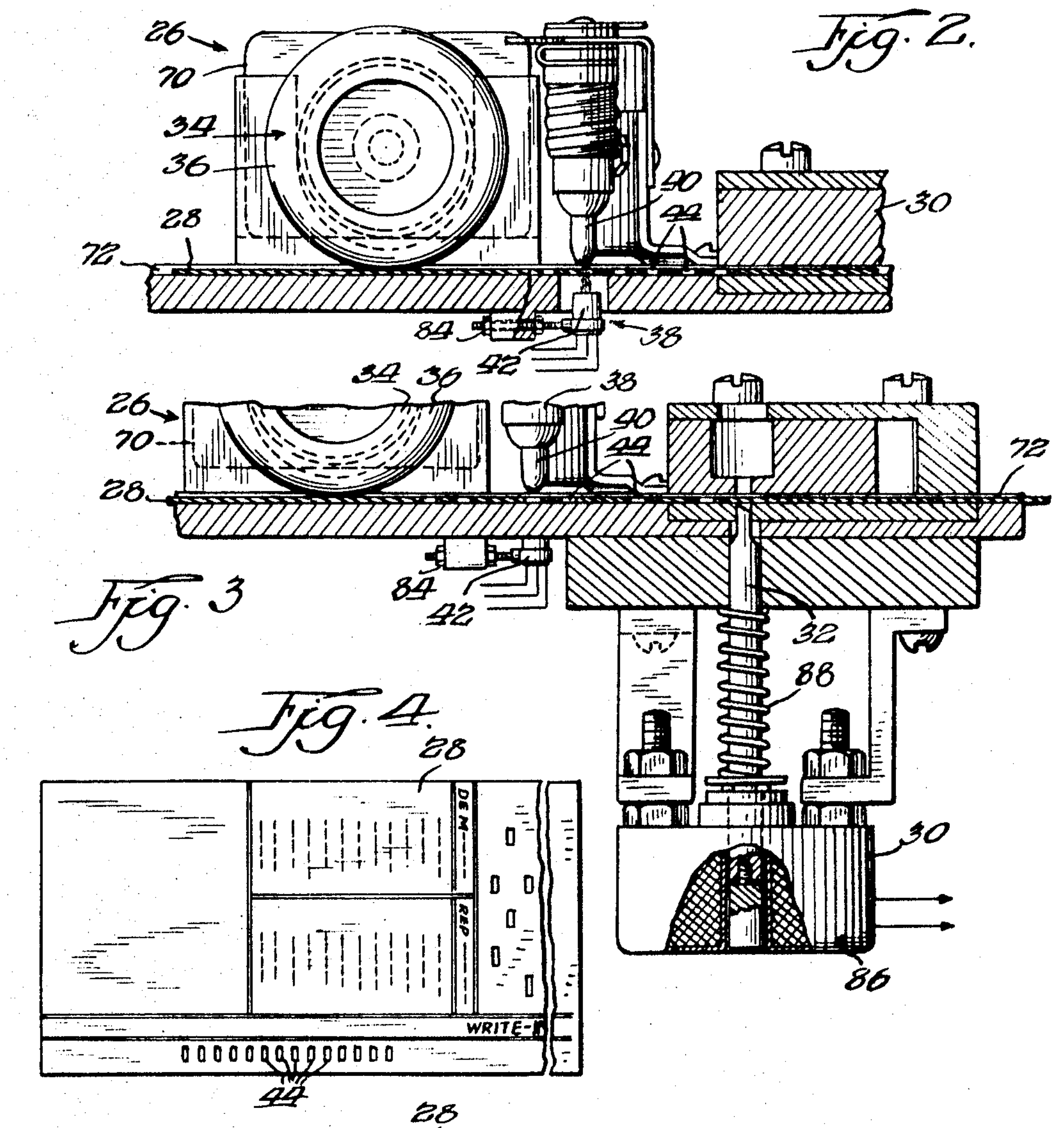
FIGURE 2 is a cross-sectional view taken along the line 2—2 of FIGURE 1.
FIGURE 3 is a cross-sectional view taken along the line 3—3 of FIGURE 1.
FIGURE 4 illustrates an exemplary individual ballot for the voting machine of FIGURE 1 comprising a generally conventional computer readable IBM card in accordance with the invention.

As shown in FIGURES 4 through 5, the ballot 28 is preferably preprinted with the names of all candidates. Upon actuation of the "record vote" button 48, the card is moved by the card transport means 34 through the card punching means 30 and the switch selections are punched adjacent the names of the selected candidates.

The write-in column is punched for that office if a write-in switch was selected. After the punching is completed, the motor increases speed and returns the card to the voter. The lights of the selected candidate switches remain on to allow the voter to check the punched ballot 28. If the voter has write-in selections, he turns the card over, records write-in selections on an unobstructed writing surface provided on the card and casts the ballot in the usual manner.

Considering in greater detail the components involved in phase one of the operation, this principally involves the electronic circuit 24, which is actuated by the candidate switches 22, and includes the candidate interlocks. Referring to the schematic of FIGURE 6 illustrating the electronic circuit 24, it may be seen that the circuitry employs a combination of generally conventional transistor and SCR circuits and components. The schematic of FIGURE 6 is divided by dotted lines into four portions indicated by A, $B_1$, B and C in the left-hand margin. Portions $B_1$ (office "1") and B (office "N") are identical and each contains the respective horizontal row of candidate select and interlock circuits for a given office circuit. The number of such office circuits will of course correspond to the number of offices to be voted, although only two are shown here. Referring to office circuit $B_1$, it may be seen that it includes here three identical silicon controlled rectifier candidate circuits, each one connected to a candidate switch 22 and labeled "REP.," "DEM." and "WRITE-IN" here respectively. Light bulbs 50 are in the anode units of each SCR. These light bulbs 50 provide the lights associated with each of the candidate switches 22.

Considering now the interlock circuit for preventing voting for more than one candidate, it may be seen that the anode current of all three SCR's in the office circuit is supplied through a circuit of two transistors 52 and 54, which circuit has the capability of momentarily interrupting the SCR's anode current so as to effect turn-off of the SCR's. Transistor 52 has its base returned to current through a resistor string which normally holds it in saturation. When any one of the three candidate switches 22 is depresed, a negative pulse is applied to the base of the transistor 54, which is normally cut off. This turns transistor 54 on and robs the saturation current from the base of the transistor 52 causing transistor 52 to cut off for approximately 50 milliseconds. This shuts off any SCR for the office which was previously on, thus preventing any possible overvoting. Since the dwelling time of the voter's finger on the selected candidate switch is long compared to 50 milliseconds, the SCR connected to that particular candidate switch turns on again when transistor 52 returns to saturation. A silicon diode may be provided in the emitter of transistor 52 to assure full cut-off when transistor 52 saturates.

Referring to FIGURE 8, there is shown therein an electronic office circuit basically identical in its corresponding components to the office circuits in the electronic circuit 24 of FIGURE 6. It contains nine identical SCR circuits, each controlling a candidate light 50, and a two transistor circuit is arranged to cause a momentary 50 millisecond shut-off or all SCR current. However, the circuit of FIGURE 8 provides a different type of interlock for multiple candidate selections for a given office, such as trustees, commissioners, board members, etc. The particular circuit illustrated in FIGURE 8 is for the election of three officers from nine possible candidates for a given office. In this circuit, after three candidates have been selected, depression of a candidate switch 22 for a fourth candidate will turn that selection on but turn all three prior selections off.

The SCR anode current in the circuit of FIGURE 8 is not shut off until the voltage of a Zener diode 56 drops below its Zener voltage. A common lead 58 is connected to each SCR anode through a resistor 60 in each case. A potentiometer 62 is connected between the common lead 58 and the +6 v. line. The base of a transistor 64 is connected through the Zener diode 56 to the wiper of the potentiometer 62. As more candidates are selected, the voltage level of the common lead 58 becomes progressively more negative until the Zener diode 56 finally cuts off when the fourth candidate is selected. When this happens, transistor 64 goes out of saturation and a transistor 66, which derives its saturation current through transistor 64 and feeds all the SCR's, in turn cuts off, thereby cutting off all SCR circuits. Common lead 58 thus again goes positive and the last selected SCR is turned on as described above for the electronic circuit 24. The potentiometer 62 can be preset by election officials to regulate the Zener cut-off point and to thereby preset the number of candidates to be elected for the office.

Considering the circuitry for the erasing or clearing of all the selections for candidates for a given party, the three "clear" switches are so labeled in FIGURE 6. It may be seen that each "clear" switch when depressed momentarily interrupts the ground returns for all SCR's in the vertical column corresponding to that party, thus causing all lights for that party to extinguish.

Considering now phase two of the voting machine 20 in detail, this phase occurs after the "record vote" button 48 is depressed. It involves the transportation of the card through the punch unit 26; the sensing of the positioning indicia 44 on the card by the light sensor 42 and the producing of a timing pulse for each detection; the advancing of a scaler circuit one step each time such a timing pulse is provided to interrogate the SCR circuits; actuating of solenoid driver SCR circuits for the card punching means 30 from the candidate SCR circuits; and returning of the card after the punching is completed by a fast transport circuit.

When the "record vote" switch 48, shown at the top lefthand corner of FIGURE 6, is closed a positive pulse is applied to SCR 68, which thereby turns on and supplies +6 v. to a conventional electric constant speed motor 70. The motor 70 provides the driving power for the card transport means 34. The motor 70 may be directly connected to the friction wheel 36 which rotates against the surface of the ballot 28 to pull the ballot through a milled raceway 72. The raceway 72 provides accurate lateral positioning of the card. If desired, the friction wheel 36 may be tilted at a slight angle to the raceway 72 so as to urge the card firmly against one edge of the raceway. The motor 70 preferably pulls the ballot through the raceway at approximately one inch per second. However, speed accuracy is not at all critical.

SCR 68 draws its anode current through a transistor 74 which is normally saturated. The saturation current to the base of transistor 74 is supplied in series with a resistor and diode through the coil of a reed relay 76. Application of positive voltage to the reed relay coil through the lead 78 causes transistor 74 to cut off, thus suspending current to SCR 68 and turning it off.

Considering now the sensing means 38, SCR 68 above also supplies 6 v. D.C. to light bulbs 40 and 80 connected in series. The bulb 80 is an indicator light for the "record vote" button 48 to indicate its actuation. The light bulb 40 is the card interrogation light and is mounted overlying the raceway 72 so as to shine on the ballot 28 passing thereby. Directly opposite the light bulb 40, beneath the raceway 72, is a light controlled silicon rectifier or LCSR light sensor 42. The exemplary ballot 28 shown herein has a series of programed holes prepunched in row 12 to provide the positioning indicia 44, and, accordingly, here both the light bulb 40 and the light sensor 42 are preferably adjacent the path of row 12 of the ballot through the raceway 72. Each hole passing over the light sensor provides a light pulse to turn on the light sensor 42, thereby discharging a capacitor 81 through a resistive load in the cathode of the light sensor. A charging resistor 82 is incapable of supplying sufficient holding current to the light sensor 42 so that the light sensor is turned off when the capacitor 81 is discharged. This prevents "chattering," or multiple timing pulses from the light sensor. The capacitor 80 then recharges. Thus, a single low impedance exponential positive pulse of several milliseconds duration is produced at the cathode of the light sensor 42 each time a positioning indicia 44 is detected passing the light sensor 42. Each pulse is a basic timing pulse used to advance a scaler circuit described hereinbelow for the sequential interrogation of the various offices. Further, each such pulse from the light sensor 42 is a fire command pulse for the card punching means 30 which pulse provides the sole punch positioning control for the spacing of the punches in the direction of the card movement. As the card movement is here longitudinal, the card, punch position registration for each of the up to 80 standard IBM column positions may be provided.

Preferably, the positioning indicia 44 comprise apertures spaced along that dimension of the card which is moved through the punching means 30. The spacing therebetween is preferably that provided by prepunching the card with the standard IBM spacing in one row, here in row 12. Each positioning indicia 44 controls the spacing between adjacent punched columns. It is not possible to have any cumulative error with this system since each column punched in the card is positionally controlled by an individual positioning indicia moving with the card, and not by the edge of the card.

It will be appreciated that it is not essential that the positioning indicia be in or on the card itself as long as it is directly associated with and moving with the card. Further, there may be, as is shown for the ballot 28, a longitudinal displacement on the card between a positioning indicia and the punched column area on the card which it controls. This longitudinal displacement here corresponds to the longitudinal displacement between the punches 32 and the sensing means 38. A trimmer screw 84 is preferably provided for a fine adjustment of this longitudinal spacing by movement of the light sensor 42 so as to adjust the punch positions to register perfectly with the standard IBM column positions.

The card punching unit 26 is capable of a punching position accuracy of ±.001 inch. This is a substantially greater accuracy then even the high standard of ±.005 inch preferred to eliminate any posibility of read-out errors for IBM cards.

The card punching means 30 is here provided with three solenoids 86, one for each of the offices to be punched, located in rows 4, 9 and 11 respectively. Each solenoid 86 is preferably a conventional electrical solenoid with its slug directly connected to one of the punches 32 to drive the punch through the data card into an opposing die. The punches are very rapidly driven through the card by the punch circuitry shown in circuit C of FIGURE 6. Rapid return of the punch is provided by a compression spring 88. Preferably, the punch has a tool steel tip with a compound angular face.

It will be observed that the card is punched on the "fly," i.e. the card transport means 34 is not stopped, rather the punch 32 itself "nails" the card, and the friction drive wheel 36 simply automatically disengages by slipping until the punch emerges from the card. The punch is driven in and out in only approximately 50 milliseconds, and this operating time is very constant. There is a very constant operating time of approximately 20 milliseconds between the application of the firing signal and the entrance of the punch into the card. In this latter period the card moves only approximately .020 inch at its normal rate of speed. The card has very little inertia and reaches full speed again almost instantaneously after the punch withdraws from the card. The operating speed of the punching means 30 is essentially limited only by the operating speed for the solenoid, and, even with conventional components, it is capable of punching at the rate of 10 punches per second.

The basic timing pulses from the light sensor 42 are used to advance a scaler circuit which interrogates the candidate switch SCR circuits and causes the candidate selection information to be read out as punch controlling information signals when the appropriate position for said information on the card is reached. Each pulse from the light sensor 42 is applied to the base of a normally saturated transistor 90. The transistor 90 supplies the anode current in common to all of the SCR's 92*a*, 92*b*, 92*c* and 92*d*, which together comprise a ring scaler having one state or stage associated with each office to be voted plus two other states which may be referred to as "zero" and "*N*+1." The pulsed transistor 90 causes whichever SCR 92*a* through 92*d* is on to extinguish. However, the SCR's 92*a* through 92*c* have a corresponding capacitor 94*a* through 94*c* in their base circuits. The particular capacitor 94 associated with the SCR 92 that is on is still charged positively when transistor 90 recovers saturation. Thus, in effect, that capacitor 94 remembers which stage the scaler was in.

A transistor 95 is momentarily pulsed into saturation through a capacitor 96 when transistor 90 recovers saturation. Transistor 95 in turn supplies a negative pulse to the base of a normally cut off transistor 97*a* through 97*c* connected to the SCR's 92*a* through 92*c*. No current is available to any of the transistors 97*a* through 97*c* except the one associated with the previously "on" stage. That particular transistor 97 transfers the charge from the capacitor 94 in its stage to the gate of the succeeding stage SCR 92 to turn that stage on. Thus, the scaler advances one stage each time a timing pulse is provided from the sensing means 38.

The scaler is set to the "zero" state, or SCR 92*a*, by the signal from the "record vote" button through SCR 68. Then, as the card moves through the card punching unit 26 and pulses are provided from the light sensor 42, the scaler stages advance from the "zero" stage through the various stages to finally the "*N*+1" stage, or SCR 92*d*. When the scaler is in the "*N*+1" stage, a positive voltage exists at the cathode of SCR 92*d*. This voltage is applied through the lead 78 to actuate the reed switch 76 and simultaneously turn off SCR 68 as previously described. When SCR 68 is turned off, the +6 v. to the motor and to the light bulbs 40 and 80 is removed. With light 40 extinguished, no further light sensor 42 pulses are possible and the scaler consequently stops in stage "*N*+1."

Considering the operation as a particular scaler stage is turned on, it may be seen that each of the scaler SCR's 92*b* and 92*c* is connected to the emitter of a transistor 98 in each of the candidate SCR circuits for a given office. The base of each transistor 98 is connected through a current limiting resistor to the anode of the candidate SCR. If a candidate SCR is on, its anode will be at approximately 0.6 volt causing its associated transistor 98 to be in saturation. With the associated scaler 92 SCR also turned on, the positive voltage therefrom is gated through the transistor 98 to form a fire command for firing the punch, i.e. the information is caused to be read at that moment into the ballot. It will be seen that the collectors of all the transistors 98 in a given vertical column are capacitively connected to the gate of a respective punch solenoid driver SCR 99*a* through 99*c*.

Although not essential, a high speed return is preferably provided to return the card rapidly to the voter after the punching is completed. This is provided herein as follows. It will be recalled that the scaler SCR 92*d* of stage "*N*+1" operates the read switch 76. The read switch is so connected that, when it is actuated, the switch common element moves from its normal contact with a grounded terminal to a contact connected to one element of a card feeler 104. This card feeler 104 comprises in effect a spring switch which normally grounds against the raceway 72 unless a ballot is passing through it.

While the card is being processed, but after the punching is completed, as indicated by the scaler being in the stage "*N*+1," the normal six bolts supplied to the motor 70 is interrupted and the gate of an SCR 106 is no longer shunted to ground through switch 76. SCR 106 thus turns on with each positive cycle of the 40 volt A.C. supply and applies this half-wave voltage to the motor 70. Accordingly, the motor speeds up and moves the card out at a rapid rate until the card clears the card feeler 104. When the card feeler 104 closes, the gate of SCR 106 is shunted to ground through the card feeler 104 thereby turning the SCR 106 off and stopping the motor 70. The card by this time is free of the card punching means 30 and can be picked up by the voter.

It will be observed that, at this point, the machine is still locked in scaler stage "*N*+1" and in phase two. If a voter should insert another card and attempt to punch it, the above described fast transport circuit would simply return it to him without any punches. The machine cannot be recycled until the election official pushes a judge's switch shown in FIGURE 7. The judge's switch momentarily interrupts all six bolt supply voltage to the entire circuit 24 and thereby clears the entire unit.

In view of the foregoing disclosure, it is clear that there has been provided hereby improved means and methods for punching a data storage card and for voting. While the embodiments described are presently considered to be preferred, it will be appreciated that numerous further variations and modifications within the purview of those skilled in the art can be made herein without departing from the true spirit of the invention.

What is claimed is:

1. Apparatus for punching a voter data storage card having a plurality of positioning indicia serially spaced in the direction in which said card moves on said card comprising,

- a plurality of single candidate selector means for indicating the selecting of only one candidate for an office,
- card punching means for selectively repeatedly making a plurality of punches in said card in response to information signals applied thereto,
- card transport means for moving the card through said punching means,
- sensing means positioned with respect to and connected to drive said punching means, said sensing means sensing the positioning indicia on said card as the card moves through said punching means to produce pulses in response thereto,
- scalar circuit means responsive to pulses of said sensing means to interrogate each one of said plurality of single candidate selector means and producing a punch operating signal applied to said punching means each time a positioning indicia passes said sensing means,
- said punching means being actuated only by the combination of information signals applied thereto and said punch operating signal, the card punches being actuated in the direction in which the card is transported solely by said punch operating signal.

2. The apparatus for punching a data storage card of claim 1 in which said card transport means is adapted to move the card through said punching means continuously with interruption only by the actuation of said punching means.

3. The apparatus for punching a data storage card of claim 1 including terminal means for sensing the initiation and completion of the movement of the card through said punching means and card removal means for removing the card from said punching means after punching is completed.

4. The apparatus for punching a data storage card of claim 1 in which said punching means includes a row of plural spaced punches transverse the direction of movement of the card, each said punch being selectively individually electrically rendered operable by information signals and adapted to repeatedly punch the card transported thereby.

5. The apparatus for punching a data storage card of claim 4 in which said row of punches are simultaneously actuated by said sensing means.

6. The apparatus for punching a data storage card of claim 1 wherein said card transport means comprises a continuous drive for the card which disengages only when said punching means is actuated, and lateral guide means for lateral alignment of the card through said punching means.

7. The apparatus for punching a data storage card of claim 1 wherein said sensing means and said punching means are spaced apart along the direction of card movement by a maintained distance, and including means for adjusting said maintained distance to provide punching position registry adjustment.

8. The apparatus of claim 1 wherein said selector means includes a plurality of voter switches adapted to provide a voter selection of candidates in an election and circuit means connected to said punching means and said voter switches for sensing the condition of said voter switches and providing information signals therefrom to said punching means.

9. The apparatus for punching a data storage card of claim 1 wherein said punching means includes a row of plural punches transverse the direction of movement of the card and a punch control means associated with each said punch for rendering its said punch operable in response to an information signal applied to said punch control means by said sensing means, and said punching means further includes punch driver means operable by said punch control means.

References Cited

UNITED STATES PATENTS

| | | | |
|---|---|---|---|
| 2,326,204 | 8/1943 | Dowey et al. | 235—50 |
| 2,471,774 | 5/1949 | Powell | 235—50 |
| 3,094,277 | 6/1963 | Wilcox | 235—50 |
| 3,098,607 | 7/1963 | McCaskill | 235—54 |
| 3,104,805 | 9/1963 | Holicky | 235—50 |
| 3,148,827 | 9/1964 | Hunt | 235—50 |
| 3,214,091 | 10/1965 | Clark | 235—50 |
| 3,227,364 | 1/1966 | Clark | 235—50 |
| 3,232,528 | 2/1966 | Crossland et al. | 235—50 |

STEPHEN J. TOMSKY, Primary Examiner

S. A. WAL, Assistant Examiner

U.S. Cl. X.R.

235—50